United States Patent [19]

Stange et al.

[11] 4,049,255

[45] Sept. 20, 1977

[54] APPARATUS FOR FEEDING DOCUMENTS TO AND FROM A COPIER

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 664,603

[22] Filed: Mar. 8, 1976

[51] Int. Cl.$^2$ ............................ B65H 5/22; B65H 9/04
[52] U.S. Cl. ................................... 271/3; 271/9; 271/195; 271/236; 271/DIG. 9; 302/2 R; 355/3 R
[58] Field of Search ............... 271/3, 9, DIG. 9, 97, 271/195, 65, 236, 4; 355/24, 26, 3 R; 302/2 R, 29, 31; 360/88, 91; 353/25, 27

[56] References Cited

U.S. PATENT DOCUMENTS

| | | | |
|---|---|---|---|
| 3,293,414 | 12/1966 | Barcia | 302/2 R X |
| 3,556,513 | 1/1971 | Howard | 271/4 |
| 3,624,807 | 11/1971 | Schwebel | 271/236 |

Primary Examiner—Bruce H. Stoner, Jr.
Attorney, Agent, or Firm—Carlos Nieves; James J. Ralabate

[57] ABSTRACT

A system wherein documents are presented to a platen of a xerographic system includes a housing in which a rack for storing documents is located. The rack includes a plurality of pockets in each of which a document may be stored, the rack being movable in a vertical direction so that any one of its pockets may be aligned with an opening in the housing. A document handler resting on the platen and having a fluidically lubricated platform is used to feed documents placed on the platform through the opening and into pockets of the rack. The document handler cooperates with the platen to provide a rectangular document pocket and documents in the rack may be shuttled to and from the document pocket. Fluid streams are used to initiate movement of a document being shuttled. Documents moved to the platen are orthogonally registered with a pair of walls of the document pocket, and copies of the registered documents may be made by the xerographic system.

9 Claims, 5 Drawing Figures

APPARATUS FOR FEEDING DOCUMENTS TO AND FROM A COPIER

The subject invention generally relates to reproduction systems of the type wherein documents are posed at an exposure station, such as the platen on which original documents are placed in xerographic copiers or duplicators. Further, some of the subject matter of the present invention is related to transports used to register articles carried thereby, such as disclosed in co-pending U.S. patent application Ser. No. 627,571, Pneumatic Registration Apparatus, filed on October 31, 1975, on an invention by Klaus K. Stange, and U.S. patent application Ser. No. 649,371 Fluidic Feeding of Documents to an Exposure Station, filed on Jan. 15, 1976, on an invention by Klaus K. Stange et al, the applications being assigned to the assignee herein, Xerox Corporation.

As is well known to those familiar with commercial xerographic copiers, such as the Xerox 4000, copies of documents may be made by placing an original with an image to be copied in contact with a platen, by placing a cover over the located document and platen, and by actuating a button which initiates a machine cycle to produce a copy. In the machine process, a light image of the original is projected onto a charged photoconductive surface to produce a charge image and, subsequently, the charge image is developed with toner. The resulting toner image is thereafter transferred to copy paper and fused, the location of the fused image on the copy paper being dependent on the location of the original document on the platen. Because of this dependency, when it is desired that the location of a fused image on a copy correspond to the location of information on an original document, such document must be located precisely on a predetermined area of the platen. Obviously, this is a time-consuming operation. In such systems when it is desired to make collated copies of a plurality of documents, the cover must be lifted at least once for each copying operation or a collator must be used. Indeed, repeated lifting of a cover can be a tiring operation for a machine operator.

It is an object of the present invention to provide apparatus for automatically posing or registering documents at an exposure station.

It is another object of the present invention to provide apparatus wherein documents are fluidically fed, posed, stored, and discharged.

Briefly, the invention herein provides apparatus for posing documents on a transparent plate, such as is commonly referred to in xerographic equipment as a platen. Structurally, the apparatus includes (a) a rack having a plurality of pockets with aligned openings; (b) means for moving any pocket of the rack to a first location and to a second location; (c) fluidic means for drawing a document into any pocket stationed at said first location; (d) fluidic means for selectively ejecting or drawing into any pocket stationed at said second location a document; and (e) a document handler including means for feeding a document to any pocket located at said first location, and means cooperating with the plate for moving a document ejected from a pocket at the second location onto the plate and for feeding a document on the plate to said pocket at the second location.

Additional objects and features of the invention will become apparent by reference to the following description in conjunction with the accompanying drawings, in which.

Figure 1:
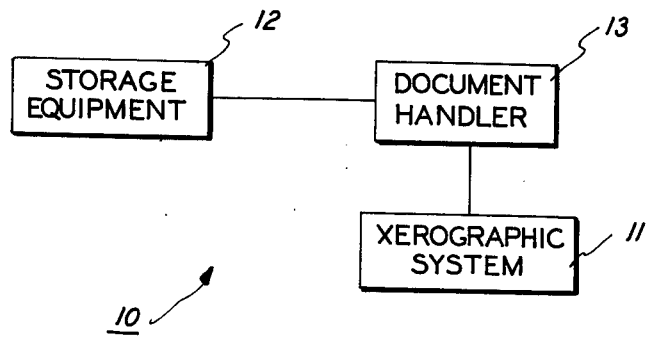
FIG. 1 is a block diagram of a reproduction system including storage equipment and a document handler, according to the invention.

Referring to FIG. 1, a reproduction system 10 includes a xerographic copying system 11 and apparatus, according to the invention, for posing documents so that copies thereof can be made. The apparatus includes document storage equipment 12 and a document handler 13.

Figure 2:
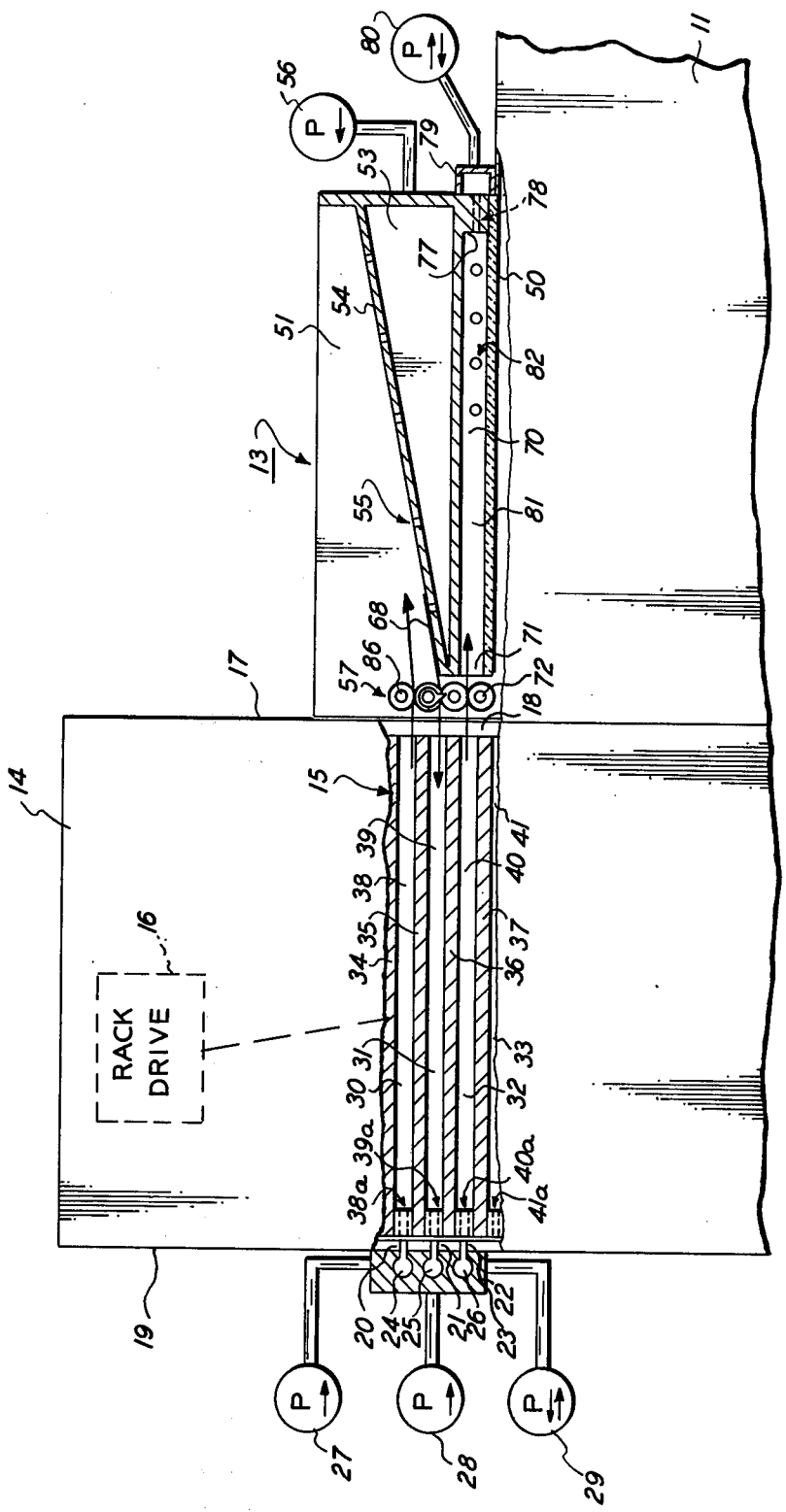
FIG. 2 is a partial side plan view of the system, sections having been removed to show internal structure of the storage equipment and the document handler.

As shown in FIG. 2, xerographic system 11 is stationed adjacent a rectangular housing 14 within which there is slidably mounted a rack 15 and means for selectively moving the rack up and down 16. Housing 14 includes on a vertical wall 17 a horizontally oriented rectangular opening 18 and on an opposite wall 19 three horizontally disposed slots 20–22 opposite opening 18. Wall 19 supports a manifold 23 having three chambers 24–26 communicating, respectively, with slots 20–22. Chamber 24 is coupled to a fluid pump 27; chamber 25 is coupled to a vacuum pump 28; and chamber 26 is coupled to a reversible pump 29.

Figure 3:
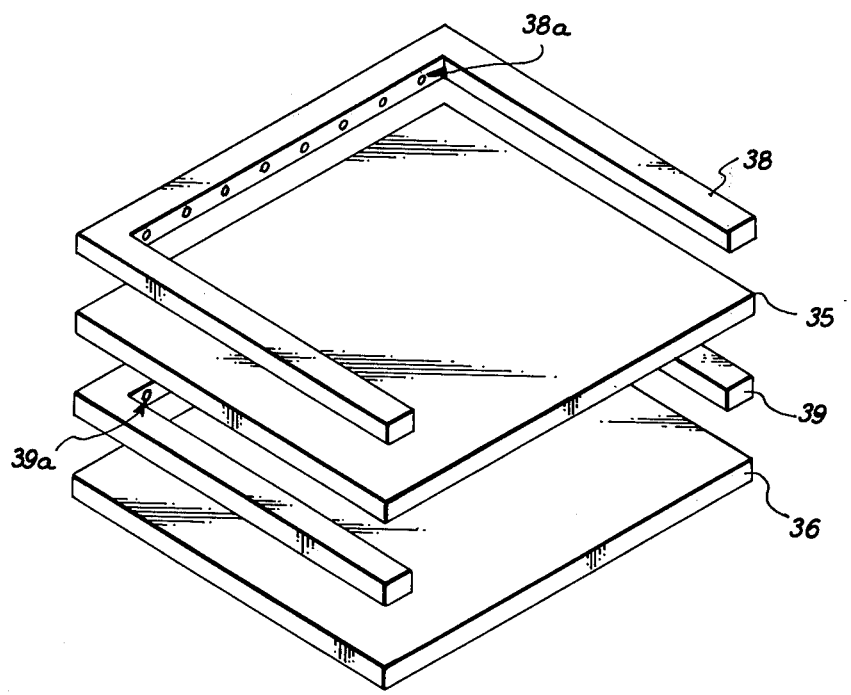
FIG. 3 is an exploded perspective view of part of the rack of the storage equipment.

Rack 15 is a rectangular structure having a plurality of storage pockets 30–33 (not all shown) extending horizontally between walls 17 and 19. As shown in FIGS. 2 and 3, the rack may be manufactured from plates 34–37 (not all shown); U-shaped spacers 38–41 (not all shown) interposed between the plates; and means for securing the spacers and plates together. Typically, the spacers and plates are fixed to each other with an adhesive; but, bolts (not shown) extending vertically through the plates and spacers and nuts cooperating therewith may be used. Each of the spacers 38–41 (not all shown) includes a horizontally disposed group of holes 38a–41a adjacent wall 19 and each group of holes can be aligned by rack drive 16 with slot 21 when its corresponding pocket is at a first location; can be aligned by the drive with slot 22 when its corresponding pocket is at a second location, and can be aligned by the drive with slot 24 when its corresponding pocket is at a third location. With the foregoing structure, if a document is fed through opening 18 into a pocket at said first location and if vacuum pump 28 is on, a fluid stream created in the pocket will draw the document in. Similarly, pump 29 may be used to draw a document into a pocket at the second location or to eject a document in the pocket through opening 18. As will appear, pump 29 is used in shuttling documents between a station, where documents are posed so that copies thereof can be made, and the rack. Pump 27 is used to eject from a pocket at a third location a document in the pocket.

Figure 4:
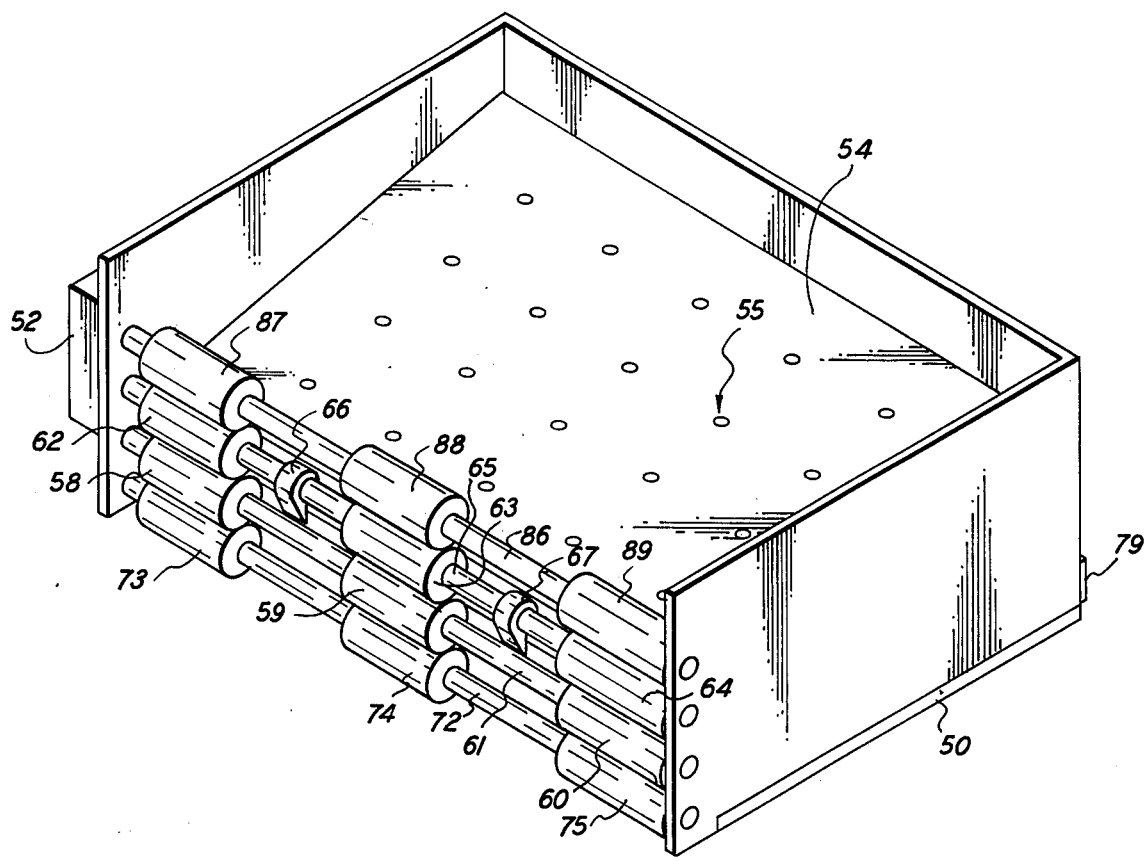
FIG. 4 is a perspective view of the document handler in abutment with a plate.

Referring to FIGS. 2 and 4, xerographic system 11 includes a transparent plate 50 or platen against which a movably mounted structure 51 of the document handler 13 is brought into abutment when it is desired to move documents into or out of the rack. The operatively disposed structure includes a chamber 53 coupled to a pump 56 and an inclined platform 54 having an array of holes 55 communicating with the chamber. Adjacent the lower edge of the platform there is located a roller arrangement 57. The arrangement includes driven rollers 58-60 (see FIG. 4) fixed to a rod 61 rotatably supported by the structure, the rod being driven by a motor in housing 52; and idler rollers 62-64 rotatably supported on another rod 65. Drive rollers 58-60 cooperate with idler rollers 62-64, respectively, to provide nips for, as explained below, driving documents. Rod 65 supports gates 66 and 67 for preventing the delivery of documents to the nips until the gates are opened, and is coupled to a drive, in housing 52, for opening and closing the gates. Operatively, with pump 56 on fluid ejected through the array of holes 55 creates a fluidic bearing on the platform and a document placed thereon slides downwardly into abutment with the gates 66 and 67. The lower edge of the platform and the nips are aligned with said first location and if a pocket of the rack is at the location the gates may be opened. With the gates open and with rod 61 suitably rotated the document may be fed into the pocket as indicated by arrow 68. To draw any part of the document which may remain outside the pocket, pump 28 may be actuated to fluidically draw the document completely inside the pocket. Thereafter, the gates may be closed until another pocket is moved to the first location and another document is placed on the platform. From the foregoing it will be appreciated that all of the pockets of the rack may be similarly filled with documents.

Figure 5:
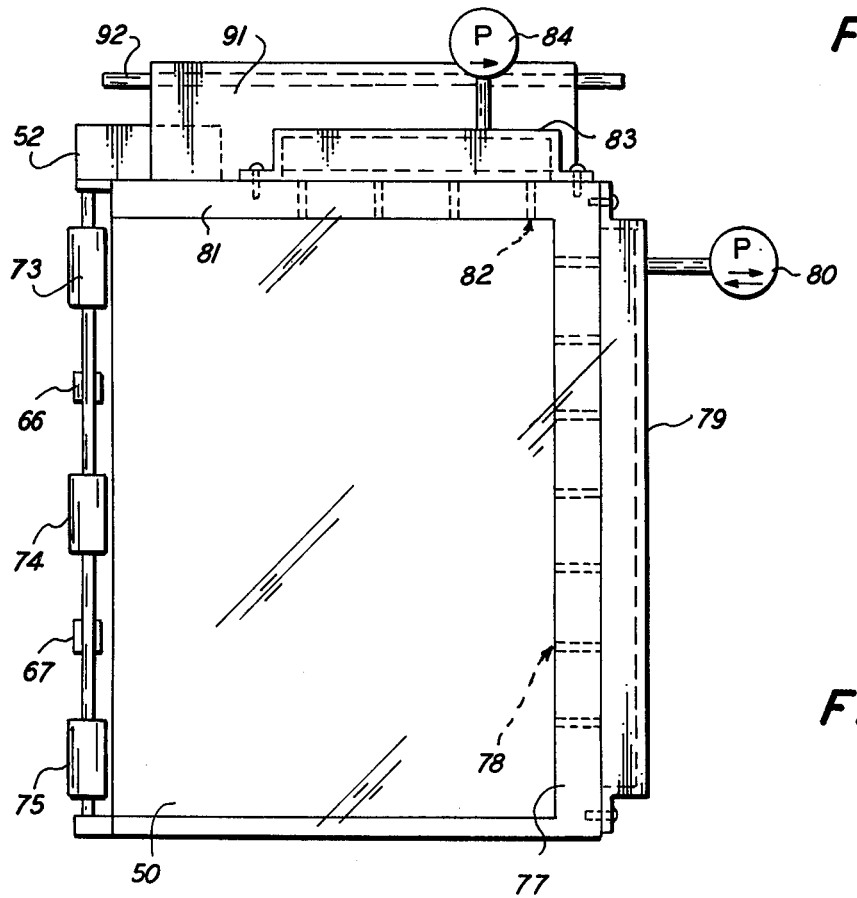
FIG. 5 is a bottom plan view of the document handler.

With the structure in abutment with plate 50 a recessed region 70 in the structure is bounded by the plate 50 to provide a horizontally disposed rectangular pocket aligned with the previously mentioned second location and having an orifice 71 facing opening 18. Between the orifice and the opening the structure supports a rod 72 on which rollers 73-75 are rotatably mounted, rod 72 being located such that rollers 73-75 cooperate with rollers 58-60, respectively, to provide nips between said second location and the rectangular pocket over the plate. With a document in a pocket at the second location, with pump 29 operated in a pressure mode, and with rod 61 suitably rotated the document will be blown into the roller arrangement and will be fed onto the plate 50. Referring to FIGS. 2 and 5, a wall 77 of the pocket, opposite the orifice, includes a series of linearly aligned holes 78 communicating with the chamber of a manifold 79 fixed to the structure, the manifold being coupled to a reversible pump 80; and another wall 81 of the pocket, orthogonally related to wall 77, includes a series of linearly aligned holes 82 communicating with the chamber of a manifold 83, manifold 83, being coupled to a vacuum pump 84. With pumps 80 and 84 operating in a vacuum mode it will be appreciated that documents entering the pocket through the orifice will be brought into registration with the walls 77 and 81 and will be located over the plate. Pumps 80 and 84 may then be turned off and copies can be made by the xerographic system. After copies have been made pump 80 can be operated in a pressure mode to move a document on the plate into the roller arrangement. With the direction of rotation of the rollers reversed the document can be moved towards a pocket of the rack and pump 29 can be used in a vacuum mode to draw the document in. From the foregoing it will be appreciated that documents in any of the pockets of the rack can be shuttled onto the plate 50.

Structure 51 also supports a rod 86 on which rollers 87-89 are rotatably mounted to provide nips with rollers 62-64, respectively, opposite said third location. The nips are disposed at a level above the lower edge of the platform and are useful for depositing on the platform documents ejected from pockets of the rack by a fluid stream originating at pump 27.

Referring to FIG. 5, structure 51 is connected to a bracket 91 which is pivotally connected by rod 92 to the frame of the xerographic system 11. As a result, the document handler may be lifted so that documents can be placed directly on plate 50 when copies of only a few documents need to be copied or when it is desired to make copies of, for example, a book.

One desiring to manufacture the apparatus described above should note that the spacing between adjacent pockets of the rack and/or multiples thereof should be considered in determining the size and location of components of the roller arrangement.

As is apparent from the description set forth above, drive 16 must be capable of moving the rack 29 in increments related to the distance between pockets of the rack. As is well known to those skilled in the elevator and related arts, this may be accomplished with motors, pulleys, and sensors, or with rack and pinion drives.

It is to be understood that the description herein of a preferred embodiment, according to the invention, has been set forth as an example thereof and is not to be construed or interpreted to provide limitations on the claims which follow and define the invention.

What is claimed is:

1. Apparatus for posing documents on a transparent plate, comprising:
   a. a rack having a plurality of pockets with aligned openings;
   b. means for moving any pocket of the rack to a first location and to a second location;
   c. fluidic means for drawing a document into any pocket stationed at said first location;
   d. fluidic means for selectively ejecting or drawing into any pocket stationed at said second location a document; and
   e. a document handler including means for feeding a document to any pocket located at said first location, and means cooperating with the plate for moving a document ejected from a pocket at the second location onto the plate and for feeding a document on the plate to said pocket at the second location, said means for feeding a document to any pocket located at said first location including an inclined platform, a gate located adjacent the bottom end of the inclined platform, and means for lubricating the top surface of the inclined platform, whereby documents placed on the platform slide towards said bottom end.

2. Apparatus as defined in claim 1 wherein said rack includes a plurality of groups of holes, each group communicating with one of the pockets; wherein said fluidic means for drawing a document into any pocket stationed at said first location includes a pump for drawing fluid from a pocket at the first location through its corresponding group of holes; and wherein said fluidic means for selectively ejecting or drawing into any pocket stationed at said second location a document includes a reversible pump for drawing or injecting fluid through a group of holes associated with a pocket stationed at said second location.

3. Apparatus as defined in claim 1 wherein said means for moving any pocket of the rack to a first location and to a second location can move any pocket of the rack to a third location and further including fluidic means for ejecting a document from any pocket stationed at said third location.

4. Apparatus as defined in claim 1 wherein said means for lubricating includes an array of holes on the platform and means for forcing fluid upwardly through said array of holes to provide a fluid bearing for documents placed on the top surface of the platform.

5. Apparatus as defined in claim 4 wherein said means for feeding a document includes a roller arrangement for driving documents located at the bottom end of the platform to any pocket located at said first location.

6. Apparatus as defined in claim 1 wherein said means cooperating with the plate includes a structure disposed above the plate, a recessed region defined in the portion of the structure adjacent the plate, said recessed region providing a pocket over the plate and means for injecting fluid into the pocket over the plate to move a document therein towards a pocket at the second location.

7. Apparatus as defined in claim 6, further including a roller arrangement for engaging a document moved by the injected fluid and feeding the document to a pocket at the second location.

8. Apparatus as defined in claim 1, further including means for moving the document handler out of cooperation with the plate.

9. Apparatus as defined in claim 1 wherein said means cooperating with the plate includes a structure disposed above the plate, a recessed region defined in the portion of the structure adjacent the plate, said recessed region providing a pocket over the plate having a pair of orthogonally related surfaces and fluidic apparatus for biasing a document in the pocket over the plate against said surfaces.

* * * * *